United States Patent [19]

Hirasa et al.

[11] Patent Number: 5,542,969
[45] Date of Patent: Aug. 6, 1996

[54] RECORDING LIQUID

[75] Inventors: Takashi Hirasa, Hiroshi Takimoto, both of Yokohama; Nobutake Mise, Kitakyushu, all of Japan

[73] Assignee: Mitsubishi Chemical Corporation, Tokyo, Japan

[21] Appl. No.: 534,017

[22] Filed: Sep. 26, 1995

[30] Foreign Application Priority Data

Sep. 27, 1994 [JP] Japan .................................... 6-231745

[51] Int. Cl.$^6$ ..................................................... C09D 11/02
[52] U.S. Cl. ........................................ 106/20 C; 106/472
[58] Field of Search ............................. 106/20 C, 23 C, 106/472

[56] References Cited

U.S. PATENT DOCUMENTS 4,164,423  8/1979  Schumacher et al. ............... 106/20 C
5,376,169  12/1994  Hotomi et al. ....................... 106/20 C
5,417,747  5/1995  Arata et al. .......................... 106/20 C
5,443,628  8/1995  Loria et al. .......................... 106/20 C

FOREIGN PATENT DOCUMENTS 2110228  6/1983  United Kingdom ................ 106/20 C

*Primary Examiner*—Helene Klemanski
*Attorney, Agent, or Firm*—Oblon, Spivak, McClelland, Maier & Neustadt, P.C.

[57] ABSTRACT

A recording liquid containing carbon black dispersed in an aqueous medium, wherein the volume ratio of carbon black having a particle size of at least 0.2 μm to the total carbon black is at least 50% by volume, and the volume ratio of carbon black having a particle size of at least 0.6 μm to the total carbon black is at most 20% by volume.

21 Claims, No Drawings

RECORDING LIQUID

The present invention relates to an aqueous recording liquid, particularly a black color type recording liquid for writing or ink jet printing.

Heretofore, a water-color ink containing an acid dye or a direct dye dissolved in an aqueous medium, or a solvent-type ink containing an oil-soluble dye dissolved in an organic solvent, has been used as a recording liquid for ink jet printing. The solvent type ink has a problem of environmental safety and it is not suitable for use in offices.

On the other hand, the water-color ink containing a water-soluble dye, has a problem that the record will be poor in water resistance, when recording is made on a pulp paper. The record with the ink also has a poor light resistance. The same problems are also found in the recording liquid for writing.

To solve such problems, it has been proposed to an aqueous dispersion ink employing a carbon black with excellent in water resistance and light resistance as the coloring material. However, the aqueous dispersion ink of carbon black has a problem such that its recording density (optical density) of the record is low. To overcome such problems, for example, Japanese Unexamined Patent Publications No. 276872/1990, No. 276783/1990, No. 276875/1990, No. 66768/1991, No. 140377/1991, Nos. 57859 to 57865/1992, No. 59879/1992, No. 332773/1992 and No. 247391/1993 propose aqueous dispersion inks using azo dyes or phthalocyanine dyes. However, their records are poor in water resistance.

Further, Japanese Unexamined Patent Publications No. 204979/1989, No. 220473/1992 and No. 1936/1994 propose ink jet recording liquid using the defined particle sizes of pigments to improve the jetting stability or to avoid clogging of the head. However, their recording densities are low.

It is an object of the present invention to provide an aqueous dispersion ink employing carbon black, which gives a record with excellent water resistance on the pulp paper by writing or ink jet recording high recording density, high reliability, excellent in fastnesses, and excellent light resistance. It is another object of the present invention to provide that an aqueous dispersion ink of which a stability of storing for a long period of time is excellent.

The present invention provides a recording liquid containing carbon black dispersed in an aqueous medium, wherein the volume ratio of carbon black having a particle size of at least 0.2 μm to the total carbon black is at least 50% by volume, and the volume ratio of carbon black having a particle size of at least 0.6 μm to the total carbon black is at most 20% by volume.

Now, the present invention will be described in detail with reference to the preferred embodiments.

The present inventors have made various studies to improve the printing density of records and water resistance of an aqueous pigment-dispersed black ink for recording liquid and as a result, have found that when a recording liquid wherein carbon black having a particle size of at least 0.2 μm is present at least 50% by volume of the total carbon black, is employed, the printing density of the obtained printed product improves and that if carbon black having a particle size of at least 0.6 μm is present in an amount larger than 20% by volume, the jetting stability or the storage stability tends to be poor. The present invention has been accomplished on the basis of this discovery. Carbon black having a particle size of at least 0.2 μm in the recording liquid is used within a range of at least 50% by volume, preferably from 50 to 80% by volume, of the total carbon black. Further, the carbon black having a particle size of at least 0.6 μm is used within a range of at most 20% by volume of the total carbon black in view of the stability. However, for the improvement of the printing record density, it is preferred that particles having particle sizes of at least 0.6 μm are present to some extent, and it is particularly preferred to employ them in an amount of at least 5% by volume. Here, the particle size is meant for the size of an agglomerate of carbon black in the solution, which is different from the primary particle size. In the present invention, this particle size is determined by diluting a sample and measuring the value of the particle size by absorptiometry by means of a centrifugal sedimentation type particle size distribution meter, as shown in Examples.

When printing is carried out by using the recording liquid having such features, a high density record can be obtained even with a pulp paper (such as acidic paper, neutral paper or alkaline paper) or recycled paper other than coated paper or paper specifically designed for ink jet printing, and the record will be excellent in fastnesses such as printing quality and light resistance other than water resistance, and the recording liquid is excellent in the stability and free from sedimentation of carbon black during the storage for a long period of time.

To obtain the recording liquid having the above features, any method may be used so long as the obtained recording liquid has the above features. For example, it may be obtained by mixing a dispersion prepared by thoroughly pulverizing carbon black so that carbon black having a particle size of at least 0.2 μm becomes at most 50% by volume of the total pigment and a dispersion prepared in the same manner by shortening the pulverization or reducing the amount of the dispersing agent only so that carbon black having a particle size of at least 0.2 μm becomes at least 60% by volume, so that carbon black having a particle size of at least 0.6 μm will be at most 20% by volume. Otherwise, it can readily be obtained by using carbon black such as #260, #10, #5 or MA220 (each being a product of Mitsubishi Chemical Corporation).

As carbon black for the recording liquid of the present invention, commercially available products may be used. Preferred is carbon black having a primary particle size of from 10 to 100 nm, a DBP oil absorption of from 40 to 150 ml/100 g and a pH of from 3 to 9. Particularly preferred is the one having a primary particle size of from 15 to 90 nm and a DBP oil absorption of from 50 to 130 ml/100 g. Specifically, products manufactured by Mitsubishi Chemical Corporation and represented by tradenames #5, #10, #30, #33, #40, #42, #45, #48, #52, #95, #960B, #2600, MA7, MA8, MA11, MA100, MA230, MA600 and #260 may, for example, be mentioned.

With respect to typical examples among them, their physical property values will be shown in Table 1 given hereinafter. Further, the carbon black chemically treated (ozone oxidation treatment or fluorination treatment), or the one having a dispersing agent or a surfactant physically or chemically bonded thereto may also be employed.

TABLE 1

|  | Primary particle size (nm) | Specific surface area (m$^2$/g) | DBP oil absorption (ml/100 g) | pH |
| --- | --- | --- | --- | --- |
| MA230 | 30 | 70 | 113 | 3.0 |
| #260 | 42 | 72 | 72 | 7.0 |
| #10 | 84 | 28 | 86 | 7.0 |
| #960B | 16 | 250 | 66 | 8.0 |

TABLE 1-continued

| | Primary particle size (nm) | Specific surface area (m²/g) | DBP oil absorption (ml/100 g) | pH |
|---|---|---|---|---|
| MA600 | 18 | 150 | 130 | 7.5 |
| MA220 | 55 | 31 | 91 | 3.0 |
| #25 | 40 | 55 | 70 | 8.0 |

A dispersing agent may not be used for the recording liquid of the present invention. However, it is preferred to incorporate a dispersing agent into the recording liquid. Useful dispersing agents include, for example, various anionic surfactants, nonionic surfactants, cationic surfactants, amphoteric surfactants, and polymer dispersants. The anionic surfactants include, for example, fatty acid salts, alkyl sulfates, alkylbezene sulfonates, alkylnaphthalene sulfonates, alkylsulfosuccinates, alkyldiphenylether disulfonates, alkyl phosphates, polyoxyethylene alkylsulfates, polyoxyethylene alkylallylsulfates, alkane sulfonates, naphthalene sulfonic acid-formalin condensation products, polyoxyethylenealkyl phosphates, and α-olefin sulfonates. The nonionic surfactants include, for example, polyoxyethylene alkyl ethers, polyoxyethylene alkylarylethers, polyoxyethylene derivatives, oxyethylene/oxypropylene block copolymers, sorbitan fatty acid esters, polyoxyethylene sorbitan fatty acid esters, polyoxyethylene sorbitol fatty acid esters, glycerol fatty acid esters, polyoxyethylene fatty acid esters, and polyoxyethylene alkylamines. The cationic surfactants and amphoteric surfactants include, for example, alkylamines, quaternary ammonium salts, alkylbetaines and aminoxides. Further, the polymer dispersants include, for example, polyacrylic acid; vinylnaphthalene/maleic acid copolymers, vinylnaphthalene/acrylic acid copolymers or their salts; copolymers of (a) styrene with (b) at least one member selected from the group consisting of maleic acid and its esters, acrylic acid and its esters, and methacrylic acid and its esters, and they may contain e.g. α-methylstyrene, as a third component. Specifically, a styrene/acrylic acid copolymer, a styrene/acrylic acid/ acrylate copolymer, a styrene/maleic acid copolymer, a styrene/maleic acid/ acrylate copolymer, a styrene/methacrylic acid copolymer, a styrene/methacrylic acid/acrylate copolymer, a styrene/maleic acid half ester copolymer, or their salts may, for example, be mentioned. Among them, anionic surfactants, nonionic surfactants and polymer dispersants are particularly preferred. Particularly preferred is a dispersing agent selected from the group consisting of $C_{8-20}$ α-olefin sulfonates, copolymers of (a) styrene with (b) at least one member selected from the group consisting of maleic acid and its esters, acrylic acid and its esters, and methacrylic acid and its esters, and their salts.

The aqueous medium to be used for the recording liquid of the present invention is composed mainly of water, but it is preferred to incorporate a water-soluble organic solvent to water. The water-soluble organic solvent may, for example, glycols such as ethylene glycol, propylene glycol, butylene glycol, diethylene glycol, triethylene glycol, polyethylene glycol (molecular weight: about 190 to about 400) and glycerol, alkyl ethers of such glycols, N-methylpyrrolidone, 1,3-dimethylimidazolidinone, thiodiglycol, 2-pyrrolidone, sulforane, dimethylsulfoxide, lower alkanolamines such as diethanolamine and triethanolamine, and lower alcohols such as ethanol and isopropanol.

To the recording liquid of the present invention, a water-soluble resin, a fungicide, a bactericide, a pH-controlling agent, urea or the like, may be incorporated, as the case requires, in addition to the above described components.

Carbon black is used usually within a range of from 1 to 10% by weight, preferably from 3 to 8% by weight, to the recording liquid. When a dispersing agent is used, it is preferably incorporated within a range of from 5 to 100% by weight, more preferably from 5 to 30% by weight, to the carbon black. The amount of the water-soluble organic solvent in the recording liquid is preferably within a range of from 5 to 30% by weight, more preferably from 10 to 20% by weight.

Each of the carbon black, the dispersing agent and the organic solvent may consist of a single substance, but may be a combination of two or more substances in some cases, so that better effects can be obtained.

To prepare the recording liquid of the present invention, firstly the above described respective components are mixed, and carbon black is pulverized into fine particles and dispersed by means of a dispersing apparatus. As the dispersing apparatus, a ball mill, a roll mill or a sand grind mill may, for example, be employed. Particularly preferred is a sand grind mill. The dispersing apparatus and its operational conditions should be selected so that high efficiency can be obtained, and the treating time should be made short in order to avoid inclusion of impurities. After this grinding and dispersing treatment, coarse particles will be removed by means of a filtration apparatus or a centrifugal separator. Among the components for the recording liquid, components other than the carbon black, the dispersing agent and water, may be added after the grinding and dispersing treatment. The grinding and dispersing treatment can efficiently be carried out when the carbon black concentration is high (e.g. at a level of from 5 to 20% by weight). Accordingly, it is preferred to prepare a treating solution in a concentration higher than the predetermined concentration of carbon black finally in the recording liquid (about 2–10 times as much as the concentration of carbon black finally in the recording liquid) and to dilute it, as the case requires, with a dispersing agent, an aqueous medium (water and a water-soluble organic solvent) or a pH-controlling agent, to finally adjust the carbon black concentration in the recording liquid.

Now, the present invention will be described in further detail with reference to Examples. However, it should be understood that the present invention is by no means restricted to such specific Examples. Further, in the following description, "parts" means "parts by weight", unless otherwise specified.

EXAMPLE 1

Preparation of a recording liquid

| Composition of recording liquid | Amount (parts) |
|---|---|
| Glycerol | 16 |
| Ethylene glycol | 18 |
| Riporan PB-800 (tradename for sodium α-olefin sulfonate type anionic surfactant, manufactured by Lion Corporation) | 2 |
| Carbon black #260 (tradename, manufactured by Mitsubishi Chemical Corporation) | 11 |
| Deionized water | 53 |
| Total | 100 |

The above-identified components were taken into a stainless steel container having an inner diameter of 4.5 cm and subjected to pulverization treatment at 2,500 rpm for 60 hours by means of a sand grinder together with 152 parts of glass beads having an average size of 0.5 mm using stainless steel stirring vanes with three discs having a diameter of 3 cm. The obtained liquid was diluted with 127 parts of deionized water and stirred. Then, it was filtered under pressure by means of No. 2 filter paper. The liquid thereby obtained was used as a recording liquid.

Measurement of particle size distribution

The particle size distribution and the average particle size of carbon black in the recording liquid obtained by the method disclosed in the above Example 1 were measured by means of a centrifugal sedimentation type particle size distribution meter (CAPA-500, tradename, manufactured by Horiba Seisakusho). However, in this method, the particle size distribution is measured by absorbance, and the recording liquid itself has a high concentration of carbon black, and it is difficult to directly measure the particle size distribution. Accordingly, the recording liquid is diluted with deionized water until the absorbance at the initiation of the measurement would be 0.8, and the particle size was measured under the following conditions:

Measuring conditions

Solvent density: 1.00; Sample density: 1.86

Solvent viscosity: 1.00; Speed (rpm): 5,000

Dia(MAX): 1.0

Dia(MIn): 0.05; Dia(DIV): 0.05

The results are shown in Table 2. The average particle size D (volume average) was 0.22 μm.

Printing test

Using the recording liquid obtained by the method disclosed in the above Example, ink jet recording was carried out on an electrophotographic paper (4024 paper, tradename, manufactured by Xerox Corporation) by means of an ink jet printer (BJ-10v, tradename, manufactured by Canon Corporation), whereby stable and good jetting performance was obtained without clogging, and a printed product having good printing quality was obtained.

Evaluation of printing record density

The density of the printed product obtained by the above printing test was measured by means of a Macbeth reflection densitometer (RD914). The results of evaluation are shown in Table 3.

Water resistance test

The printed product obtained in the printing test, was immersed in city water in a beaker for 5 seconds. The printed product was dried, and the presence or absence of print smudging was visually evaluated. The results were evaluated under the following standards and shown in Table 3.

Evaluation standards

○: No substantial print smudging observed.

Δ: Slight print smudging observed, but practically no problem.

x: Substantial print smudging observed.

Light resistance test

The printed product was irradiated for 100 hours by means of a xenon fade meter (manufactured by Suga Shikenki K.K.), whereupon discoloration was visually evaluated. The results were evaluated under the following standards and shown in Table 3.

Evaluation standards

○: Good

Δ: Slight discoloration observed, but practically no problem x: Substantial discoloration observed Storage stability test of the recording liquid The recording liquid was sealed in a Teflon container and stored at 60° C. for one month, whereupon the presence or absence of gelation or precipitation was visually evaluated. The results were evaluated under the following standards and shown in Table 3.

Evaluation standards

○: No substantial gelation or precipitation observed.

Δ: Slight gelation or precipitation observed, but practically no problem.

x: Substantial gelation or precipitation observed.

EXAMPLE 2

Preparation of recording liquid

| Composition of dispersion ① | Amount (parts) |
| --- | --- |
| Glycerol | 16 |
| Ethylene glycol | 18 |
| Riporan PB-800 | 1 |
| Carbon black MA230 (tradename, manufactured by Mitsubishi Chemical Corporation) | 11 |
| Deionized water | 54 |
| Total | 100 |

The above components were taken into a stainless steel container having an inner diameter of 4.5 cm and subjected to pulverization treatment at 2,500 rpm for 60 hours by means of a sand grinder together with 152 parts of glass beads having an average size of 0.5 mm using stainless steel stirring vanes with three disc having a diameter of 3 cm. The obtained liquid was diluted with 127 parts of deionized water and stirred. Then, it was filtered under pressure by means of No. 2 filter paper. The liquid thereby obtained was designated as dispersion ①.

| Composition of dispersion ② | Amount (parts) |
| --- | --- |
| Glycerol | 16 |
| Ethylene glycol | 18 |
| Riporan PB-800 | 2 |
| Carbon black MA230 | 11 |
| Deionized water | 53 |
| Total | 100 |

The above components were taken into a stainless steel container having an inner diameter of 4.5 cm and subjected to pulverization treatment at 2,500 rpm for 60 hours by means of a sand grinder together with 152 parts of glass beads having an average size of 0.5 mm using stainless steel stirring vanes with three discs having a diameter of 3 cm. The obtained liquid was diluted with 127 parts of deionized water and stirred. Then, it was filtered under pressure by means of No. 5C filter paper. The liquid thereby obtained was designated as dispersion ②. The obtained dispersions ① and ② were mixed in a weight ratio of 1:1, and the mixture was used as a recording liquid. The particle size distribution of carbon black in this recording liquid was measured in the same manner as in Example 1, and the results are shown in Table 2. The average particle size D (volume average) was 0.21 μm.

With respect to this recording liquid, the printing test, the water resistance test, the light resistance test and the storage stability test were carried out in the same manners as in Example 1. The evaluation results are shown in Table 3.

EXAMPLE 3

Preparation of recording liquid

| Composition of dispersion ③ | Amount (parts) |
| --- | --- |
| Glycerol | 16 |
| Ethylene glycol | 18 |
| Polystar S2-1020 (non volatile content) (tradename for a styrene-maleic acid type copolymer, anionic surfactant, manufactured by Nippon Oil & Fat Co., Ltd.) | 3 |
| Carbon black MA600 (tradename, manufactured by Mitsubishi Chemical Corporation) | 11 |
| Deionized water | 52 |
| Total | 100 |

The above components were taken into a stainless steel container having an inner diameter of 4.5 cm and subjected to pulverization treatment at 2,500 rpm for 60 hours by means of a sand grinder together with 152 parts of glass beads having an average size of 0.5 mm using stainless steel stirring vanes with three discs having a diameter of 3 cm. The obtained liquid was diluted with 127 parts of deionized water and stirred. Then, it was filtered under pressure by means of No. 5 filter paper. The liquid thereby obtained was designated as dispersion ③.

The same composition as dispersion ① was subjected to pulverization treatment by the same dispersing apparatus for a treating time shortened to 6 hours, and the obtained product was diluted and stirred in the same manner as for dispersion ①. Then, it was filtered under pressure by means of No. 2 filter paper. The liquid thereby obtained was designated as dispersion ④.

The obtained dispersions ③ and ④ were mixed in a weight ratio of 1:1, and the mixture was used as a recording liquid. The particle size distribution of carbon black in this recording liquid was measured in the same manner as in Example 1, and the results are shown in Table 2. The average particle size D (volume average) was 0.25 μm.

With respect to this recording liquid, the printing test, the water resistance test, the light resistance test and the storage stability test were carried out in the same manners as in Example 1. The evaluation results are shown in Table 3.

EXAMPLE 4

Preparation of recording liquid

| Composition of recording liquid | Amount (parts) |
| --- | --- |
| Glycerol | 16 |
| Ethylene glycol | 18 |
| Riporan PB-800 | 1 |
| Carbon black #10 (tradename, manufactured by Mitsubishi Chemical Corporation) | 11 |
| Deionized water | 54 |
| Total | 100 |

The above components were taken into a stainless steel container having an inner diameter of 4.5 cm and subjected to pulverization treatment at 2,500 rpm for 60 hours by means of a sand grinder together with 152 parts of glass beads having an average size of 0.5 mm using stainless steel stirring vanes with three discs having a diameter of 3 cm. The obtained liquid was diluted with 127 parts of deionized water and stirred. Then, it was filtered under pressure by means of No. 5C filter paper. The liquid thereby obtained was used as a recording liquid.

The particle size distribution of carbon black in this recording liquid was measured in the same manner as in Example 1, and the results are shown in Table 2. The average particle size D (volume average) was 0.25 μm.

With respect to this recording liquid, the printing test, the water resistance test, the light resistance test and the storage stability test were carried out in the same manner as in Example 1. The results are shown in Table 3.

EXAMPLE 5

A recording liquid was prepared in the same manner as in Example 4 except that instead of carbon black "#10", the same amount of carbon black "#MA220 (tradename)", manufactured by Mitsubishi Chemical Corporation, was used. The particle size distribution of carbon black in this recording liquid was measured in the same manner as in Example 1, and the results are shown in Table 2. The average particle size D (volume average) was 0.34 μm.

With respect to this recording liquid, the printing test, the water resistance test, the light resistance test and the storage stability test were carried out in the same manner as in Example 1. The results are shown in Table 3.

EXAMPLE 6

A recording liquid was prepared in the same manner as in Example 4 except that the amount of "Riporan PB-800" was changed to 0.6 part, the amount of carbon black "#10" was changed to 6.8 parts and the amount of deionized water was changed to 58.6 parts to make the total amount to be 100 parts, followed by pulverization treatment. The particle size distribution of the pigment in this recording liquid was measured in the same manner as in Example 1, and the results are shown in Table 2. The average particle size D (volume average) was 0.24 μm.

With respect to this recording liquid, the printing test, the water resistance test, the light resistance test and the storage stability test were carried out in the same manner as in Example 1. The results are shown in Table 3.

COMPARATIVE EXAMPLE 1

Dispersion ② in Example 2 was used alone as a recording liquid.

The particle size distribution of carbon black in this recording liquid was measured in the same manner as in Example 1, and the results are shown in Table 2. The average particle size D (volume average) was 0.13 μm.

The printing test, the water resistance test, the light resistance test and the storage stability test were carried out in the same manner as in Example 1. The evaluation results are shown in Table 3.

COMPARATIVE EXAMPLE 2

Preparation of recording liquid

| Composition of recording liquid | Amount (parts) |
| --- | --- |
| Glycerol | 16 |
| Ethylene glycol | 18 |
| Polystar S2-1020 (non-volatile content) (tradename, manufactured by Nippon Oil & Fat Co., Ltd.) | 5 |
| Carbon black #960B (tradename, manufactured by Mitsubishi Chemical Corporation) | 18 |
| Deionized water | 43 |
| Total | 100 |

The above components were taken into a stainless steel container having an inner diameter of 4.5 cm and subjected to pulverization treatment at 2,500 rpm for 60 hours by means of a sand grinder together with 152 parts of glass beads having an average size of 0.5 mm using stainless steel stirring vanes with three discs having a diameter of 3 cm. The obtained liquid was diluted with 127 parts of deionized water and stirred. Then, it was filtered under pressure by means of No. 5C filter paper. The liquid thereby obtained was used as a recording liquid.

The particle size distribution of carbon black in this recording liquid was measured in the same manner as in Example 1, and the results are shown in Table 2. The average particle size D (volume average) was 0.05 μm.

The printing test, the water resistance test, the light resistance test and the storage stability test were carried out in the same manner as in Example 1. The evaluation results are shown in Table 3.

TABLE 2

| | Example 1 Particle size distribution (% by volume) | | | Example 2 Particle size distribution (% by volume) | | |
| --- | --- | --- | --- | --- | --- | --- |
| Particle size (μm) | Proportion (%) | Total (%) | Particle size (μm) | Proportion (%) | Total (%) | |
| 1.00< | 0.0 | 0.0 | 1.00< | 0.0 | 0.0 | |
| 1.00–0.95 | 5.3 | 5.3 | 1.00–0.95 | 4.7 | 4.7 | |
| 0.95–0.90 | 0.0 | 5.3 | 0.95–0.90 | 0.0 | 4.7 | |
| 0.90–0.85 | 0.0 | 5.3 | 0.90–0.85 | 0.0 | 4.7 | |
| 0.85–0.80 | 0.0 | 5.3 | 0.85–0.80 | 0.0 | 4.7 | |
| 0.80–0.75 | 0.0 | 5.3 | 0.80–0.75 | 0.0 | 4.7 | |
| 0.75–0.70 | 0.8 | 6.1 | 0.75–0.70 | 0.0 | 4.7 | |
| 0.70–0.65 | 2.2 | 8.3 | 0.70–0.65 | 0.0 | 4.7 | |
| 0.65–0.60 | 2.8 | 11.1 | 0.65–0.60 | 3.6 | 8.3 | |
| 0.60–0.55 | 2.6 | 13.7 | 0.60–0.55 | 0.0 | 8.3 | |
| 0.55–0.50 | 0.0 | 13.7 | 0.55–0.50 | 0.6 | 8.9 | |
| 0.50–0.45 | 3.1 | 16.8 | 0.50–0.45 | 2.4 | 11.3 | |
| 0.45–0.40 | 3.7 | 20.5 | 0.45–0.40 | 3.3 | 14.6 | |

TABLE 2-continued

| 0.40–0.35 | 4.0 | 24.5 | 0.40–0.35 | 2.9 | 17.5 |
| --- | --- | --- | --- | --- | --- |
| 0.35–0.30 | 6.7 | 31.1 | 0.35–0.30 | 8.1 | 25.6 |
| 0.30–0.25 | 9.5 | 40.6 | 0.30–0.25 | 13.3 | 36.9 |
| 0.25–0.20 | 13.8 | 54.5 | 0.25–0.20 | 12.9 | 51.8 |
| 0.20–0.15 | 14.2 | 68.7 | 0.20–0.15 | 15.8 | 67.6 |
| 0.15–0.10 | 15.8 | 84.5 | 0.15–0.10 | 18.7 | 86.3 |
| 0.10–0.05 | 12.8 | 97.3 | 0.10–0.05 | 11.0 | 97.3 |
| 0.05–0.00 | 2.7 | 100.0 | 0.05–0.00 | 2.7 | 100.0 |

| | Example 3 Particle size distribution (% by volume) | | | Example 4 Particle size distribution (% by volume) | | |
| --- | --- | --- | --- | --- | --- | --- |
| Particle size (μm) | Proportion (%) | Total (%) | Particle size (μm) | Proportion (%) | Total (%) | |
| 1.00< | 0.0 | 0.0 | 1.00< | 0.0 | 0.0 | |
| 1.00–0.95 | 0.5 | 0.5 | 1.00–0.95 | 0.8 | 0.8 | |
| 0.95–0.90 | 1.1 | 1.6 | 0.95–0.90 | 0.0 | 0.8 | |
| 0.90–0.85 | 0.1 | 1.7 | 0.90–0.85 | 0.0 | 0.8 | |
| 0.85–0.80 | 0.9 | 2.6 | 0.85–0.80 | 1.8 | 2.7 | |
| 0.80–0.75 | 1.2 | 3.8 | 0.80–0.75 | 0.8 | 3.4 | |
| 0.75–0.70 | 2.8 | 6.7 | 0.75–0.70 | 1.9 | 5.3 | |
| 0.70–0.65 | 2.6 | 9.3 | 0.70–0.65 | 3.2 | 8.5 | |
| 0.65–0.60 | 0.3 | 9.5 | 0.65–0.60 | 1.7 | 10.1 | |
| 0.60–0.55 | 3.2 | 12.7 | 0.60–0.55 | 2.5 | 12.6 | |
| 0.55–0.50 | 3.9 | 16.7 | 0.55–0.50 | 0.7 | 13.3 | |
| 0.50–0.45 | 5.4 | 22.0 | 0.50–0.45 | 3.3 | 16.6 | |
| 0.45–0.40 | 5.8 | 27.8 | 0.45–0.40 | 5.9 | 22.4 | |
| 0.40–0.35 | 5.8 | 33.7 | 0.40–0.35 | 10.6 | 33.0 | |
| 0.35–0.30 | 8.4 | 42.1 | 0.35–0.30 | 5.4 | 38.3 | |
| 0.30–0.25 | 8.6 | 50.6 | 0.30–0.25 | 10.2 | 48.6 | |
| 0.25–0.20 | 9.4 | 60.1 | 0.25–0.20 | 15.2 | 63.8 | |
| 0.20–0.15 | 13.9 | 73.9 | 0.20–0.15 | 15.4 | 79.2 | |
| 0.15–0.10 | 11.9 | 85.8 | 0.15–0.10 | 11.9 | 91.2 | |
| 0.10–0.05 | 11.6 | 97.4 | 0.10–0.05 | 7.9 | 99.0 | |
| 0.05–0.00 | 2.6 | 100.0 | 0.05–0.00 | 1.0 | 100.0 | |

| | Comparative Example 1 Particle size distribution (% by volume) | | | Comparative Example 2 Particle size distribution (% by volume) | | |
| --- | --- | --- | --- | --- | --- | --- |
| Particle size (μm) | Proportion (%) | Total (%) | Particle size (μm) | Proportion (%) | Total (%) | |
| 1.00< | 0.0 | 0.0 | 1.00< | 0.0 | 0.0 | |
| 1.00–0.95 | 0.0 | 0.0 | 1.00–0.95 | 6.4 | 6.4 | |
| 0.95–0.90 | 0.0 | 0.0 | 0.95–0.90 | 4.4 | 10.9 | |
| 0.90–0.85 | 0.0 | 0.0 | 0.90–0.85 | 0.3 | 11.1 | |
| 0.85–0.80 | 0.0 | 0.0 | 0.85–0.80 | 0.0 | 11.1 | |
| 0.80–0.75 | 0.0 | 0.0 | 0.80–0.75 | 0.0 | 11.1 | |
| 0.75–0.70 | 0.0 | 0.0 | 0.75–0.70 | 2.5 | 13.6 | |
| 0.70–0.65 | 2.1 | 2.1 | 0.70–0.65 | 0.0 | 13.6 | |
| 0.65–0.60 | 0.0 | 2.1 | 0.65–0.60 | 1.0 | 14.6 | |
| 0.60–0.55 | 0.0 | 2.1 | 0.60–0.55 | 0.0 | 14.6 | |
| 0.55–0.50 | 1.2 | 3.3 | 0.55–0.50 | 0.4 | 15.1 | |
| 0.50–0.45 | 0.0 | 3.3 | 0.50–0.45 | 0.0 | 15.1 | |
| 0.45–0.40 | 2.0 | 5.3 | 0.45–0.40 | 0.0 | 15.1 | |
| 0.40–0.35 | 3.5 | 8.9 | 0.40–0.35 | 0.0 | 15.1 | |
| 0.35–0.30 | 2.2 | 11.1 | 0.35–0.30 | 0.5 | 15.6 | |
| 0.30–0.25 | 4.3 | 15.3 | 0.30–0.25 | 2.3 | 17.9 | |
| 0.25–0.20 | 9.4 | 24.7 | 0.25–0.20 | 1.8 | 19.7 | |
| 0.20–0.15 | 17.2 | 41.9 | 0.20–0.15 | 5.1 | 24.8 | |
| 0.15–0.10 | 25.1 | 67.0 | 0.15–0.10 | 10.1 | 35.0 | |
| 0.10–0.05 | 25.5 | 92.5 | 0.10–0.05 | 10.1 | 45.1 | |
| 0.05–0.00 | 7.5 | 100.0 | 0.05–0.00 | 54.9 | 100.0 | |

| | Example 5 Particle size distribution (% by volume) | | | Example 6 Particle size distribution (% by volume) | | |
| --- | --- | --- | --- | --- | --- | --- |
| Particle size (μm) | Proportion (%) | Total (%) | Particle size (μm) | Proportion (%) | Total (%) | |
| 1.00< | 0.0 | 0.0 | 1.00< | 0.0 | 0.0 | |
| 1.00–0.95 | 4.2 | 4.2 | 1.00–0.95 | 0.7 | 0.7 | |
| 0.95–0.90 | 2.4 | 6.5 | 0.95–0.90 | 0.0 | 0.7 | |
| 0.90–0.85 | 1.0 | 7.5 | 0.90–0.85 | 0.4 | 1.0 | |
| 0.85–0.80 | 0.0 | 7.5 | 0.85–0.80 | 2.5 | 3.6 | |

TABLE 2-continued

| | | | | | |
|---|---|---|---|---|---|
| 0.80–0.75 | 2.3 | 9.8 | 0.80–0.75 | 2.0 | 5.5 |
| 0.75–0.70 | 2.9 | 12.7 | 0.75–0.70 | 0.9 | 6.4 |
| 0.70–0.65 | 4.0 | 16.7 | 0.70–0.65 | 2.6 | 9.0 |
| 0.65–0.60 | 0.9 | 17.6 | 0.65–0.60 | 4.6 | 13.7 |
| 0.60–0.55 | 4.9 | 22.5 | 0.60–0.55 | 0.0 | 13.7 |
| 0.55–0.50 | 4.2 | 26.6 | 0.55–0.50 | 0.0 | 13.7 |
| 0.50–0.45 | 6.9 | 33.6 | 0.50–0.45 | 3.0 | 16.7 |
| 0.45–0.40 | 7.1 | 40.7 | 0.45–0.40 | 2.7 | 19.4 |
| 0.40–0.35 | 7.5 | 48.2 | 0.40–0.35 | 4.1 | 23.5 |
| 0.35–0.30 | 9.3 | 57.5 | 0.35–0.30 | 8.0 | 31.4 |
| 0.30–0.25 | 10.2 | 67.7 | 0.30–0.25 | 14.3 | 45.7 |
| 0.25–0.20 | 11.1 | 78.8 | 0.25–0.20 | 16.1 | 61.8 |
| 0.20–0.15 | 8.8 | 87.6 | 0.20–0.15 | 14.9 | 76.7 |
| 0.15–0.10 | 7.1 | 94.7 | 0.15–0.10 | 13.6 | 90.3 |
| 0.10–0.05 | 4.8 | 99.9 | 0.10–0.05 | 8.7 | 98.9 |
| 0.05–0.00 | 0.4 | 100.0 | 0.05–0.00 | 1.1 | 100.0 |
| Average particle size: 0.34 (μm) | | | Average particle size: 0.24 (μm) | | |

TABLE 3

| Example | Water resistance test | Light resistance test | Storage stability | Printing record density |
|---|---|---|---|---|
| 1 | ○ | ○ | ○ | 1.28 |
| 2 | ○ | ○ | ○ | 1.33 |
| 3 | ○ | ○ | ○ | 1.32 |
| 4 | ○ | ○ | ○ | 1.29 |
| 5 | ○ | ○ | ○ | 1.39 |
| 6 | ○ | ○ | ○ | 1.30 |
| comparative Example | | | | |
| 1 | ○ | ○ | ○ | 1.05 |
| 2 | ○ | ○ | ○ | 1.11 |

EXAMPLE 3

Particle size distributions of carbon black in two types of inks A (ink for DeskJet 1200C, cartridge No. 51640A, tradename, manufactured by Hewlett Packard Company) and B (Nasuka Ink, tradename, manufactured by Dainichi Seika Color & Chemicals MFG., Co., Ltd.) commercially available as ink jet recording liquids employing carbon black, were measured in the same manner as in Example 1, and the results are shown in Table 4.

The printing test, the water resistance test, the light resistance test and the storage stability test were carried out in the same manner as in Example 1. The evaluation results are shown in Table 5.

TABLE 4

| Comparative Example 3 Ink A Particle size distribution (% by volume) | | | Ink B Particle size distribution (% by volume) | | |
|---|---|---|---|---|---|
| Particle size (μm) | Proportion (%) | Total (%) | Particle size (μm) | Proportion (%) | Total (%) |
| 1.00< | 0.0 | 0.0 | 1.00< | 0.0 | 0.0 |
| 1.00–0.95 | 0.0 | 0.0 | 1.00–0.95 | 3.8 | 3.8 |
| 0.95–0.90 | 0.3 | 0.3 | 0.95–0.90 | 0.0 | 3.8 |
| 0.90–0.85 | 0.0 | 0.3 | 0.90–0.85 | 0.0 | 3.8 |
| 0.85–0.80 | 0.0 | 0.3 | 0.85–0.80 | 0.0 | 3.8 |
| 0.80–0.75 | 0.0 | 0.3 | 0.80–0.75 | 0.7 | 4.5 |
| 0.75–0.70 | 0.0 | 0.3 | 0.75–0.70 | 0.0 | 4.5 |
| 0.70–0.65 | 0.6 | 0.9 | 0.70–0.65 | 0.0 | 4.5 |

TABLE 4-continued

| Comparative Example 3 Ink A Particle size distribution (% by volume) | | | Ink B Particle size distribution (% by volume) | | |
|---|---|---|---|---|---|
| Particle size (μm) | Proportion (%) | Total (%) | Particle size (μm) | Proportion (%) | Total (%) |
| 0.65–0.60 | 0.9 | 1.8 | 0.65–0.60 | 1.5 | 6.0 |
| 0.60–0.55 | 0.0 | 1.8 | 0.60–0.55 | 0.0 | 6.0 |
| 0.55–0.50 | 1.1 | 2.9 | 0.55–0.50 | 1.0 | 7.0 |
| 0.50–0.45 | 0.0 | 2.9 | 0.50–0.45 | 3.5 | 10.5 |
| 0.45–0.40 | 1.0 | 3.9 | 0.45–0.40 | 0.8 | 11.3 |
| 0.40–0.35 | 2.4 | 6.3 | 0.40–0.35 | 1.0 | 12.3 |
| 0.35–0.30 | 4.2 | 10.5 | 0.35–0.30 | 0.0 | 12.3 |
| 0.30–0.25 | 3.1 | 13.7 | 0.30–0.25 | 3.0 | 15.2 |
| 0.25–0.20 | 6.5 | 20.2 | 0.25–0.20 | 4.3 | 19.6 |
| 0.20–0.15 | 8.6 | 28.9 | 0.20–0.15 | 6.4 | 25.9 |
| 0.15–0.10 | 14.4 | 43.2 | 0.15–0.10 | 15.4 | 41.3 |
| 0.10–0.05 | 30.7 | 74.0 | 0.10–0.05 | 21.9 | 63.2 |
| 0.05–0.00 | 26.0 | 100.0 | 0.05–0.00 | 36.8 | 100.0 |
| Average particle size: 0.09 (μm) | | | Average particle size: 0.08 (μm) | | |

COMPARATIVE EXAMPLE 4

Preparation of recording liquid

| Composition of recording liquid | Amount (parts) |
|---|---|
| Glycerol | 16 |
| Ethylene glycol | 18 |
| Riporan PB-800 (tradename, manufactured by Nippon Oil & Fat Co., Ltd.) | 2 |
| Carbon black MA230 (tradename, manufactured by Mitsubishi Chemical Corporation) | 11 |
| Deionized water | 53 |
| Total | 100 |

The above components were taken into a stainless steel container having an inner diameter of 4.5 cm and subjected to pulverization treatment at 2,500 rpm for 60 hours by means of a sand grinder together with 152 parts of glass beads having an average size of 0.5 mm using stainless steel stirring vanes with three discs having a diameter of 3 cm. The obtained liquid was diluted with 127 parts of deionized water and stirred. Then, it was filtered under pressure by means of No. 5C filter paper. The liquid thereby obtained was used as a recording liquid.

The particle size distribution of carbon black in this recording liquid was measured in the same manner as in Example 1, and the results are shown in Table 6.

The printing test, the water resistance test, the light resistance test and the storage stability test were carried out in the same manner as in Example 1, whereby the result of the printing test (the printing density) was 1.08, and other results were good as in Example 1 (as shown in Table 5).

By using the ink jet recording liquid of the present invention, the jetting performance is excellent, and highly reliable recording can be done. Even when recording is made on a normal paper, it is possible to obtain a black color record whereby the water resistance is good, the printing record density is high and which is excellent in fastnesses such as printing quality and light resistance in addition to the water resistance. By virtue of the above features, the recording liquid of the present invention is useful not only for ink jet printing and writing but also as a recording liquid for other purposes.

TABLE 5

| | Water resistance test | Water resistance test | Storage stability | Printing record density |
|---|---|---|---|---|
| Comparative Example 3 A | ○ | ○ | ○ | 1.11 |
| Comparative Example 3 B | ○ | ○ | ○ | 1.13 |
| Comparative Example 4 | ○ | ○ | ○ | 1.08 |

TABLE 6

Comparative Example 4
Particle size distribution
(% by volume)

| Particle size (μm) | Proportion (%) | Total (%) |
|---|---|---|
| 1.00< | 0.0 | 0.0 |
| 1.00–0.95 | 0.0 | 0.0 |
| 0.95–0.90 | 9.0 | 9.0 |
| 0.90–0.85 | 0.6 | 9.6 |
| 0.85–0.80 | 0.0 | 9.6 |
| 0.80–0.75 | 0.0 | 9.6 |
| 0.75–0.70 | 0.0 | 9.6 |
| 0.70–0.65 | 0.0 | 9.6 |
| 0.65–0.60 | 0.0 | 9.6 |
| 0.60–0.55 | 0.5 | 10.1 |
| 0.55–0.50 | 0.2 | 10.3 |
| 0.50–0.45 | 2.8 | 13.0 |
| 0.45–0.40 | 4.8 | 17.8 |
| 0.40–0.35 | 0.0 | 17.8 |
| 0.35–0.30 | 2.8 | 20.6 |
| 0.30–0.25 | 3.0 | 23.6 |
| 0.25–0.20 | 9.2 | 32.8 |
| 0.20–0.15 | 17.8 | 50.6 |
| 0.15–0.10 | 18.4 | 69.0 |
| 0.10–0.05 | 23.6 | 92.6 |
| 0.05–0.00 | 7.4 | 100.0 |

Average particle size: 0.15 (μm)

What is claimed is:

1. A recording liquid containing carbon black dispersed in an aqueous medium, wherein the volume ratio of carbon black having a particle size of at least 0.2 μm to the total carbon black is at least 50% by volume, and the volume ratio of carbon black having a particle size of at least 0.6 μm to the total carbon black is at most 20% by volume.

2. The recording liquid according to claim 1, wherein the volume ratio of carbon black having a particle size of at least 0.2 μm to the total carbon black is from 50 to 80% by volume.

3. The recording liquid according to claim 1, wherein the volume ratio of carbon black having a particle size of at least 0.6 μm to the total carbon black is from 5 to 20% by volume.

4. The recording liquid according to claim 1, wherein the carbon black has an average particle size of from 0.15 to 0.45μm.

5. The recording liquid according to claim 1, wherein the carbon black has a primary particle size of from 10 to 100 nm, a DBP oil absorption of from 40 to 150 ml/100 g, and a pH of from 3 to 9.

6. The recording liquid according to claim 5, wherein the primary particle size of the carbon black is from 15 to 90 nm.

7. The recording liquid according to claim 5, wherein the DBP oil absorption of the carbon black is from 50 to 130 ml/100 g.

8. The recording liquid according to claim 1, wherein a dispersing agent is incorporated to the recording liquid.

9. The recording liquid according to claim 8, wherein the dispersing agent is selected from the group consisting of anionic surfactants, nonionic surfactants and polymer dispersants.

10. The recording liquid according to claim 8, wherein the dispersing agent is selected from the group consisting of sulfonates of $C_{8-20}$ α-olefins, copolymers of (a) styrene with (b) at least one member selected from the group consisting of maleic acid and its esters, acrylic acid and its esters, and methacrylic acid and its esters, and their salts.

11. The recording liquid according to claim 1, wherein the aqueous medium is composed of water and a water-soluble organic solvent.

12. The recording liquid according to claim 11, wherein the water-soluble organic solvent is selected from the group consisting of ethylene glycol, propylene glycol, butylene glycol, diethylene glycol, triethylene glycol, polyethylene glycol (molecular weight: from about 190 to about 400), glycerol, alkyl ethers of such glycols and glycerol, N-methylpyrrolidone, 1,3-dimethylimidazolidinone, thiodiglycol, 2-pyrrolidone, sulforane, dimethylsulfoxide, diethanolamine, triethanolamine, ethanol and isopropanol.

13. The recording liquid according to claim 1, wherein the amount of the carbon black to the total weight of the recording liquid is from 1 to 10% by weight.

14. The recording liquid according to claim 1, wherein the amount the carbon black to the total weight of the recording liquid is from 3 to 8% by weight.

15. The recording liquid according to claim 8, wherein the amount of the dispersing agent to the amount of the carbon black is from 5 to 100% by weight.

16. The recording liquid according to claim 8, wherein the amount of the dispersing agent to the amount of the carbon black is from 5 to 30% by weight.

17. The recording liquid according to claim 11, wherein the amount of the water-soluble organic solvent to the total weight of the recording liquid is from 5 to 30% by weight.

18. The recording liquid according to claim 11, wherein the amount of the water-soluble organic solvent to the total weight of the recording liquid is from 10 to 20% by weight.

19. The recording liquid according to claim 1, which further contains a water-soluble resin, a fungicide, a bactericide, a pH-controlling agent or urea.

20. The recording liquid according to claim 1, wherein the recording liquid is prepared by grinding and dispersing carbon black in water in the presence or absence of a water-soluble organic solvent by to make an aqueous dispersion means of a ball mill, a roll mill or a sand grind mill, and then diluting the aqueous dispersion to form said recording liquid.

21. The recording liquid according to claim 20, wherein grinding and dispersing treatment were carried out by means of a sand grind mill.

* * * * *